United States Patent [19]
Klingsporn et al.

[11] Patent Number: 5,422,890
[45] Date of Patent: Jun. 6, 1995

[54] METHOD FOR DYNAMICALLY MEASURING COMPUTER DISK ERROR RATES

[75] Inventors: Benny J. Klingsporn, Spring; Steven E. Fairchild, Houston; Mark T. Lundgreen, Cypress; Michael R. Geroche, Tomball, all of Tex.

[73] Assignee: Compaq Computer Corporation, Houston, Tex.

[21] Appl. No.: 796,051

[22] Filed: Nov. 19, 1991

[51] Int. Cl.⁶ .............................................. G11C 29/00
[52] U.S. Cl. ...................... 371/21.6; 371/5.1
[58] Field of Search .................. 371/21.6, 21.1, 21.2, 371/5.1, 5.2, 5.3, 5.5; 360/54; 324/128 R

[56] References Cited

U.S. PATENT DOCUMENTS

| | | | |
|---|---|---|---|
| 3,704,363 | 11/1972 | Salmassy et al. | 324/73 R |
| 4,348,761 | 9/1982 | Berger | 371/21.6 |
| 4,710,925 | 12/1987 | Negi | 371/5.5 |
| 4,933,939 | 6/1990 | Kendall et al. | 371/5.5 |
| 5,067,128 | 11/1991 | Nakane | 371/5.1 |

OTHER PUBLICATIONS

"Software for Reliability Testing of Computer Peripherals: A Case History":; 8102 IEEE Transactions on Reliability R-35 (1986) Aug., No. 3, New York, USA.

Primary Examiner—Robert W. Beausoliel, Jr.
Assistant Examiner—Ly V. Hua
Attorney, Agent, or Firm—Pravel, Hewitt, Kimball & Krieger

[57] ABSTRACT

A dynamic testing method for determining disk drive error rates based on the number of bytes which are read from a hard disk drive during test. The method identifies specific faulting disk sectors and disk error types and maintains a log of the errors. The method also accumulates the total number of bytes which have been read from the disk and determines whether the disk under test has exceeded acceptable error rates based on the number of bytes read during the test. This permits the method to identify a disk drive as having failed its test prior to completion of the full disk drive test cycle.

6 Claims, 11 Drawing Sheets

METHOD FOR DYNAMICALLY MEASURING COMPUTER DISK ERROR RATES

BACKGROUND OF THE INVENTION

1. Field of the Invention

The present invention relates to the field of automated testing of computer equipment, more particularly, to an improved method for testing computer hard disks.

2. Description of the Related Art

Personal computers have become increasingly more powerful during the recent years and are utilized for a variety of applications in industry, business and education. The varied uses result in different requirements for various subsystems forming the complete computer system. With the increased performance of computer systems, it became apparent that mass storage subsystems, such as fixed or hard disk drives, played an increasingly important role in the transfer of data to and from the computer system.

The reliability of the hard disk drive systems is critical to the operation of computer systems. Thus, it is preferable that a hard disk drive system be thoroughly tested prior to sale of the disk drive and/or computer system incorporating the disk drive. This test procedure generally includes multiple writes and reads to sectors on the disk drive. These multiple writes/reads are used to identify errors on the disk which indicate that certain sectors on the disk cannot be reliably written or read. These errors may arise from defects in the disk media, the disk heads, disk servo mechanisms, noise or other sources. While it is preferable that a disk have no errors associated with it, as a practical matter, disk drives often have various errors, such as media errors, due to manufacturing processes, handling or other causes.

Recognizing this, disk drive manufacturers have established various acceptable error rates for disk drives. Error rates are a measure of the disks ability to consistently read and write data. As a practical matter, it is often difficult to determine the cause producing the error without significant statistical analysis. However, the data required to perform the statistical analysis is often not recorded during the disk test procedure. The acceptable error rates may be expressed as total numbers of errors for a given number of bytes, maximum acceptable errors of any type of error, or the total number of errors occurring for a given number of bytes read.

The error rates specified by disk manufacturers generally account for all disk media errors prior to shipping to the computer manufacturers. Any media errors which are detected by the disk manufacturers are generally mapped out or reallocated to alternate sectors on a disk. It will be appreciated that the design of hard disk drives often permits the creation of extra sectors which may be utilized for the reallocation process. This permits the disk manufacturers to supply the hard disks as being error free. Disk manufacturers utilize other techniques to compensate for any disk errors which may occur. One method of compensation of errors during the transmission of data is through the use of various error correction code (ECC) formats, which are known in the art. The use of ECC codes has evolved such that the disk drive controllers often perform data correction as the data stream is being read, with the computer system not even being aware of the error.

However, a manufacturer's test may not account for defects which may arise following the manufacturer's test and prior to the integration of the disk as part of a computer system. Thus, it is prudent for the computer manufacturer using the hard disk to carry out its own tests of the hard disk.

Typically, the computer manufacturer performs a disk drive test as part of a final extended burn-in test following assembly. During the burn-in, the computer system executes various test routines which are designed to exercise the various computer subsystems including disk subsystems, video subsystems and memory. These burn-in test procedures often last in excess of 72 hours. During this period, the disk test routine will write and read multiple times to the tracks on the disks and total the number of errors which occur during the disk reads. The test generally entails writing various data patterns to random and/or sequential disk tracks on the drive under test. The data patterns and track selection methods used are intended to find potential structural and electrical faults within the disk drive which may occur during everyday operation.

The disk test is generally executed for a fixed period of time, and the number and type of disk errors which occur during the burn-in are then compared with manufacturer set error rates for that type of disk upon completion of the burn-in test. The standards are generally in terms of errors of specific types for a given number of bytes read from the hard disk. Generally, the total number of bytes read is estimated based on the number of hours the disk test has been running. The disk or disks are then passed or failed based on the number of accumulated errors after the test has been completed. When the disks fail, they are generally replaced and the computer unit must again go through the full burn-in cycle.

It will be appreciated that a disk or disks may exceed the acceptable error level for the type of disk early during the burn-in test cycle. Nonetheless, the disk will continue to undergo the disk burn-in tests for the designated time period. This method of testing disk can result in considerable unwarranted manufacturing time and cost where the disk drive may fail early during the burn-in test. Further, present disk test methods often fail to distinguish between the various types of disk errors occur, which may lead to rejection of disk drives which are otherwise serviceable.

Computer manufacturers often utilize disk drives of various types, thereby complicating the task of performing the disk tests. Disk drives used within computer systems may vary as to the type of interface employed, such as Small Computer Standard Interface (SCSI) or Enhanced Small Disk Interface (ESDI) drives; the number of heads, cylinders, tracks and sectors per track for the disk; whether the disk utilizes ECC correction techniques or includes a bad sector map in a reserved area on the disk; and whether the disk employs hardware improvements, such as a memory cache located on the disk drive. A computer manufacturer's testing procedure must account for the various types of disk hardware utilized within its product line.

Thus, there exists a need for a dynamic method of measuring and recording disk error rates during a disk drive testing procedure. Further, there exists a need for a method of characterizing the types of disk errors which may occur, to permit further statistical analysis of repeated failures of a disk drive.

SUMMARY OF THE INVENTION

The system incorporating the present invention is directed to a dynamic method for evaluating disk drive error rates and passing or failing the disk drive based on these dynamic evaluations. More particularly, the system incorporating the present invention is directed to a method which is capable of dynamically tracking the error rates and error types for a variety of different disk drives. In practice, the system incorporating the present invention identifies the type of computer and disk drive(s) being tested and retrieves disk test error parameters associated with the drive(s), such as the acceptable error rate and/or the error map associated with the disk.

A system incorporating the present invention also has the ability to account for various operating modes of the disk drive. It will be appreciated that many current disk drives have a limited cache capability, where a read to a disk drive results in a read look-ahead which may be stored in a limited cache memory on the disk drive. Thus, reads to subsequent sectors would be filled from the on-disk cache without accessing the disk drive during the test procedure. A system according to the present invention has the capability of disabling the onboard disk drive cache memory and forcing the disk drive under test to actually perform the disk access operations. Similarly, a system according to the present invention is capable of disabling direct memory access (DMA) operations to the disk drive, forcing the disk drive to perform the complete read and write access cycles during the test procedure.

A system according to present invention may use a variety of different disk drive interfaces, including Enhanced Small Disk Interface (ESDI) and Small Computer System Interface (SCSI) disk drives. A system according to the present invention is also capable of accounting for any drive vendor flaw map of the type utilized in ESDI drives. Further, the system according to the present invention is capable of being used in varying disk configurations, including single disks and multiple disk drive configurations, including the use of multiple drive disks in a disk drive array configuration.

The system according to the present invention includes software running on the Unit Under Test (UUT) and is invoked when a supervisory disk drive test program detects an error during the testing procedure based on a returned code generated by the computer. The present invention is not intended to cover the selection of data patterns and tracks written and read during the disk test but rather the method of identifying faulty sectors on the tracks, characterizing the error and dynamically determining whether acceptable error rates for the disk have been exceeded following detection of the error.

Disk errors may be generally categorized into three different groups: hard errors; soft errors; and firm errors. A hard error is a repeatable, non-recoverable disk error. It is characterized as non-recoverable as the hard error disk sector address may not be retrieved. A soft error is a non-repeating error. A firm error is a repeatable, recoverable error. Firm errors are classified as soft errors for limit comparison and tests within the present invention. The ability to distinguish between the types of errors which occur during the test permits a system according to the present invention to more accurately characterize the disk under test. A system according to the present invention has the ability to distinguish between the various types of errors and to keep count of each type.

A system according to the present invention is also capable of logging or recording the data pattern being written at the time the error is detected. This error logging provides for later statistical analysis should any type of hard drive exhibit failure rates in excess of expectations. A system according to the present invention is therefore capable of determining whether a disk drive has passed or failed the test based not only on the raw number of errors which have occurred, but the number of each type of error.

A system according to the present invention thus provides a flexible means for dynamically testing various disk drives which may be used in a computer system. The ability of a system according to the present invention to distinguish between the various types of disk test errors which may occur during testing results in improved disk yields and quality of the finished product.

BRIEF DESCRIPTION OF THE DRAWINGS

A better understanding of the system incorporating the present invention can be had when the following detailed description of the preferred embodiment is considered in conjunction with the following drawings, in which.

DETAILED DESCRIPTION OF THE PREFERRED EMBODIMENT

Figure 1:
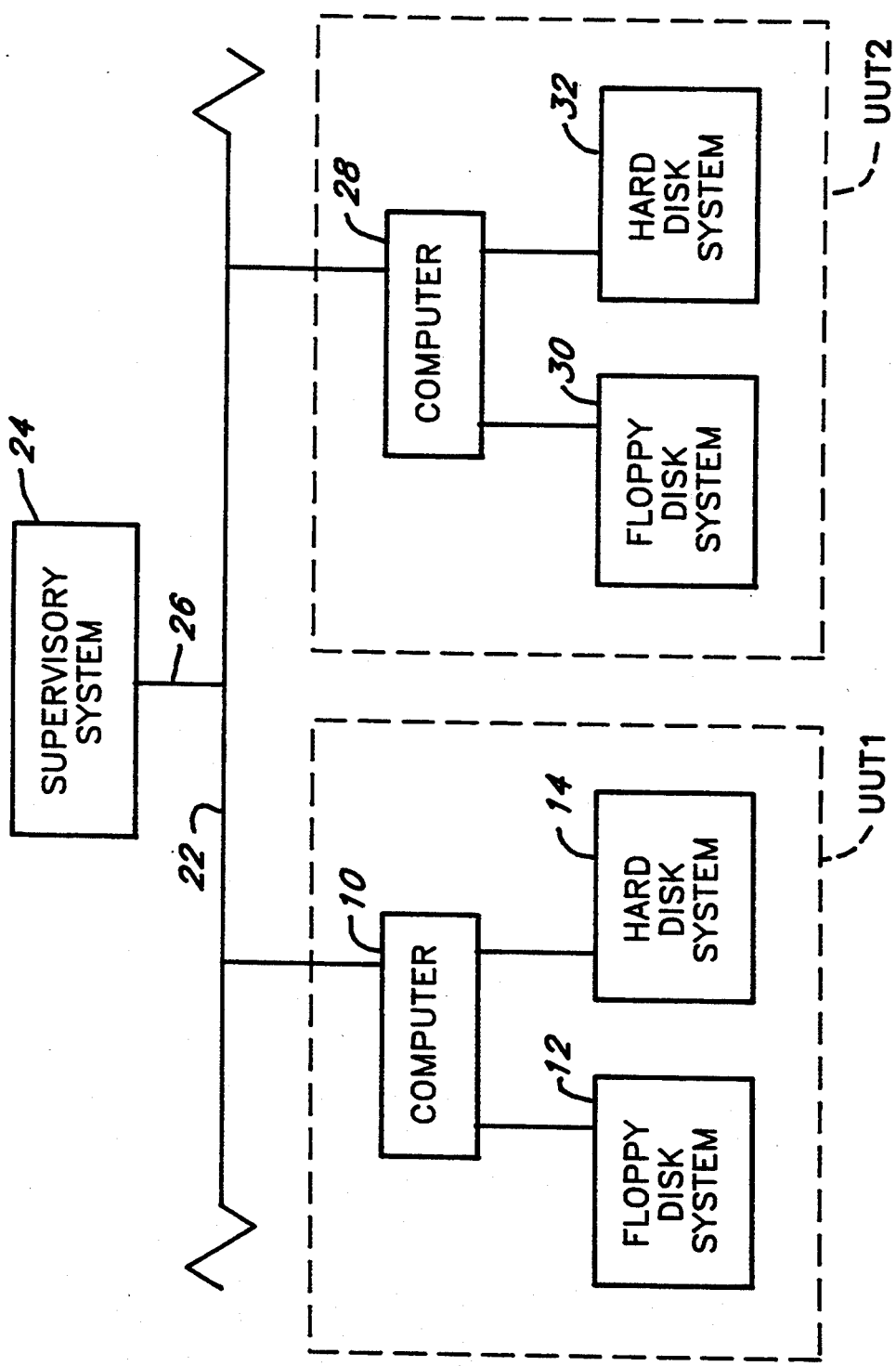
FIG. 1 is a block diagram of a computer test system utilizing the preferred embodiment of the system incorporating the present invention.

The preferred embodiment of the system incorporating the present invention operates as software running on a Unit Under Test (UUT) and is intended to track the number of bytes read from a disk drive, the number and types of disk errors which have occurred, the data pattern written on the sector in error and make a dynamic pass/fail decision based upon the number of bytes read from the disk drive during the test procedure. The preferred embodiment may be stored on a floppy disk to be read by the UUT prior to disk test initialization. The floppy disk may also be utilized to store disk drive test parameters, such as acceptable hard, soft and cumulative error rates, and test logs, including the number of errors and faulty data patterns.

The preferred embodiment instructs the UUT to write and read a pre-selected data pattern to the hard disk drive tracks specified by the test program. It will be appreciated that the test program, including track access and data pattern may vary with each disk drive. The present invention is not directed to the selection of disk drive tracks or the data pattern being written to the tracks. The track selection techniques and the data patterns used during the disk drive test procedures are well known in the art.

As the disk test program writes to and reads from the disk drive, the preferred embodiment counts the number of bytes being read from the disk drive or disk drives being tested. When an error occurs, the disk drive test procedure invokes software to characterize the error and dynamically determine whether acceptable error rates have been exceeded. A system incorporating the present invention enters this information in an error log which includes the number of hard and soft disk errors detected during the test, the sector where the error occurred, and the data pattern written on the disk drive when the error occurs. As part of the error characterization routine, a system incorporating the present invention will attempt multiple read and writes (retries) to the faulty disk drive sector to further characterize the nature of the defect. It will be appreciated that failure to retry a sector may result in the inaccurate characterization of the disk drive error, which may result in an unwarranted disk drive failure. When the defect persists during the retries, the system will instruct the computer to mark the disk drive sectors as unusable and update the disk sector map to indicate that the faulty sectors are unusable.

The computer compares the number of errors of hard, firm and soft disk errors detected during the test and compares it with the acceptable hard and soft error rates for the disk drive. When either the acceptable hard, soft or total error rates are exceeded during the test, based on the actual number of bytes read from the disk drive, the computer will close the error log and mark the UUT as having failed the hard disk subsystem test and the UUT will cease the disk drive test.

It will be appreciated that a program according to the present invention may be one of several programs executing during the burn-in period. When the computer indicates a test failure, it is contemplated that the UUT will cease all testing and communicate the disk subsystem failure to a supervisory system. The UUT may then be removed from the test procedure for further diagnostics and repair. It will be further appreciated that a system according to the present invention will save test time, as prior art tests do not dynamically pass/fail disk drive subsystems, thereby requiring the disk drive subsystem to go through a full test period, though it may have exceeded acceptable error rates early in the test procedure.

While a system according the present invention is primarily intended to be used during the initial manufacture, assembly and test procedure for the personal computer, it may also be used as a disk drive test diagnostic to be used subsequent to the sale of the personal computer on which it is running.

FIG. 1 is a block diagram of an automated test system environment in which a system incorporating the present invention may be utilized. FIG. 1 shows Unit Under Test 1 (UUT) having a computer 10, a floppy disk system 12 and a hard disk system 14. The floppy disk system 12 and hard disk system 14 are interfaced with computer 10 in the conventional manner. It is understood in the case of hard disk drive 14, the interface may include an Intelligent Drive Electronics (IDE), SCSI or ESDI interface. A second unit under test, designated UUT 2, is also shown as having a computer 28, a floppy disk drive system 30 and a hard disk drive system 32 which are also interfaced to computer 28 in the conventional manner. A supervisory computer system 24 is shown as being connected to a network 22 which permits the supervisory system 24 to monitor the units under test. Computers 10 and 28 are connected to the test network 22 and are in signal communications with the supervisory system 24. Thus, the supervisory system 24 may be utilized to monitor the progress of various tests which are being carried out on the personal computers 10, 28.

A system according to the present invention operates as software running on the unit under test. The software may be stored on a floppy disk which is inserted into the floppy disk drive system 12 of computer 10. The test disk may include the test program, as well as specific disk parameters which are to be utilized during the disk test procedure. Alternatively, the computer 10 may identify itself to the supervisory system 24 across the network 22 and the supervisory system 24 may download the test program and the disk drive specific parameters required to computer 10.

It will be appreciated that the disk drive test procedure depicted in the following Figures represents only one test which is being performed during the test burn-in procedure. Other tests designed to exercise video, memory and other computer subsystems are run on computer 10 simultaneously with the operation of a system incorporating the present invention.

Figure 2:
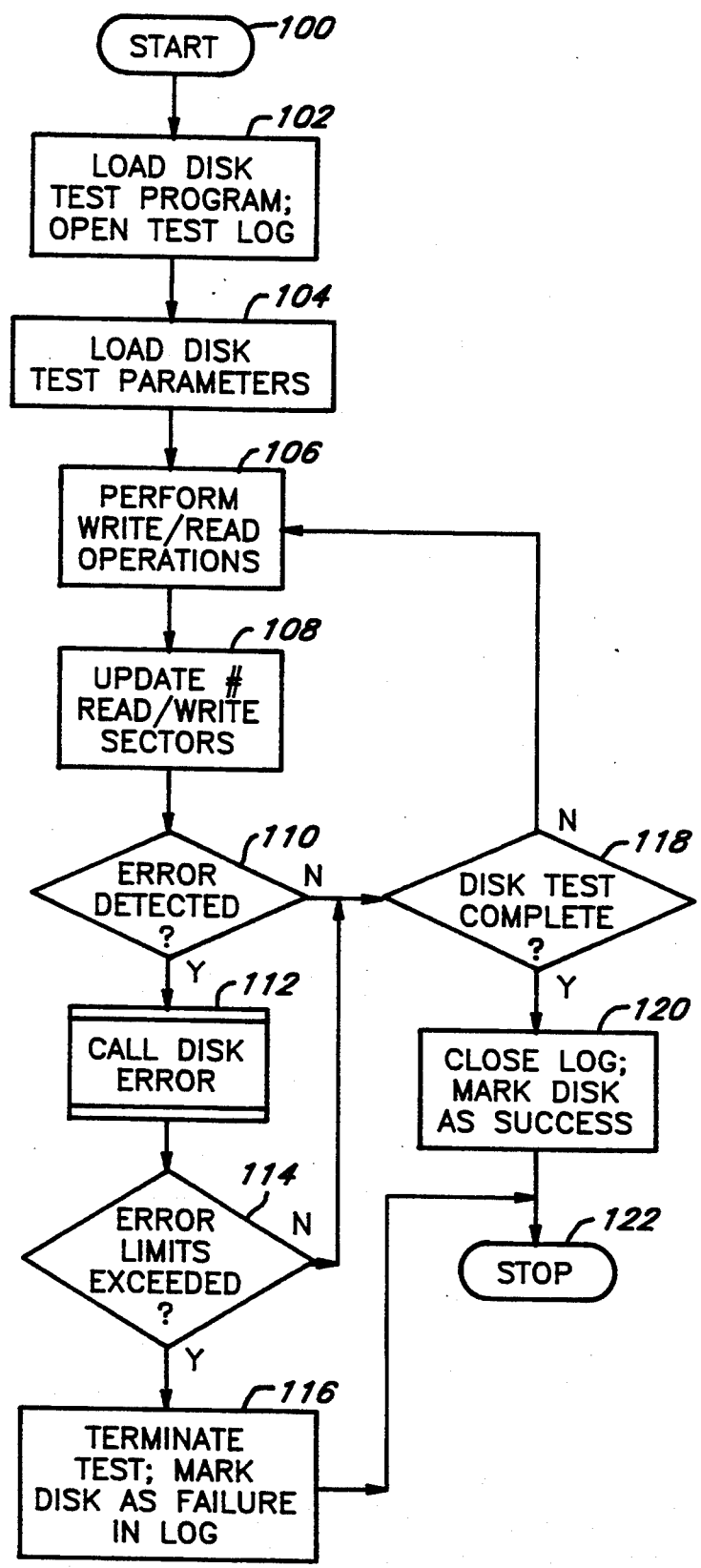
FIG. 2 is a flow diagram of the disk test procedure incorporating the preferred embodiment of the system incorporating the present invention.

FIG. 2 is a flowchart showing the method of operation of a system incorporating the present invention when loaded on computer 10. Operation of the disk drive test procedure 100 begins with step 102, where the computer 10 reads the disk drive test program from a floppy disk inserted into floppy disk drive subsystem 12. The system also instructs the computer 10 to open a test log on the floppy disk. Control transfers to step 104, where the computer 10 loads the disk drive test parameters from the floppy disk. The disk drive test parameters may include the acceptable hard error and soft error rates for the particular type of hard disk drive being tested, whether the disk drive has an ESDI, SCSI or IDE interface and other disk drive identification information. Control of computer 10 transfers to step 106, where the computer 10 begins operation of the standard disk drive test procedure. As noted above, the disk drive test procedure calls for the computer 10 to write varying data patterns to disk tracks on the disk under test and attempts to read the data patterns back from the tracks. As noted above, the method of track selection and data pattern to be written to the tracks may vary with the particular parameter being tested on the disk subsystem. Control of computer 10 transfers to step 108, where the computer 10 updates the number of bytes read from the various sectors on the disk drive to the log file maintained on the floppy disk inserted in floppy disk drive 12. Control of computer 10 transfers to step 110, where the computer 10 determines whether a disk error has occurred by means of Basic Input/Output Services (BIOS) return codes which are returned to the system disk test program upon completion of the write/read operation. The return codes are generated as part of the computer system's BIOS routines which are generally stored in Read Only Memory (ROM) on the computer 10. The return code will be either a 00h, 02h, 04h, 10h, 11h or other fatal error codes in a personal computer of the preferred embodiment. A 00h code indicates that no disk drive error has occurred. A return code of 02h, 04h, 10h or 11h indicates that a hard disk drive error has occurred somewhere on the hard disk drive track currently being written to and read from. Within the preferred embodiment, a return code other than 02h, 04h, 10h or 11h are treated as fatal errors which are not tested against predetermined error rates. When this type of error is detected, the error is logged and the drive failed, as will be discussed further below. If in step 110 the computer 10 receives a return code other than 00h, control of computer 10 transfers to step 112, where the computer 10 calls a subroutine DISK ERROR.

If in step 110 the computer 10 receives a return code of 00h, control transfers to step 118. In step 118, the computer 10 determines whether the disk test has completed its entire set of write/read operations. If the disk test has not completed, control computer 10 transfers to step 106, which continues write/read operations within the disk drive test program. If the disk drive test has completed, control of computer 10 transfers to step 120, where the computer 10 closes the error log on the floppy disk. The computer 10 also notifies the supervisory system 24 via the network 22 that the disk drive 14 has completed its test and passed the test by not exceeding any of the error rates specified for the particular disk drive. Control of computer 10 transfers to step 122, which completes operation of the system according to the present invention.

If in step 110 the system incorporating the present invention detects a return code other than 00h, control of computer 10 transfers to step 112, where the computer 10 calls the DISK ERROR subroutine. Upon return from the DISK ERROR subroutine, control transfers to step 114, where the computer 10 determines whether the number of hard, firm, soft and/or total errors detected exceeds the specified error rates, which were loaded as part of the disk parameters in step 104, for the disk drive based on the number of bytes which have been read from the disk drive. If the specified error rates are exceeded, control transfers to step 116, where the computer 10 notes in the test log that the hard disk subsystem 14 has failed and to close the test log. The computer 10 also notifies the supervisory system 24 via network 22 that the hard disk drive subsystem has failed the burn-in test. The supervisory system 24 may then be used to notify an operator that the computer 10 has failed one of its burn-in tests. The operator may then remove the computer 10 from the test network 22 to repair the unit prior to all of the burn-in tests completing. Control thereafter transfers to step 122 which terminates the disk drive test procedure.

Figure 3A:
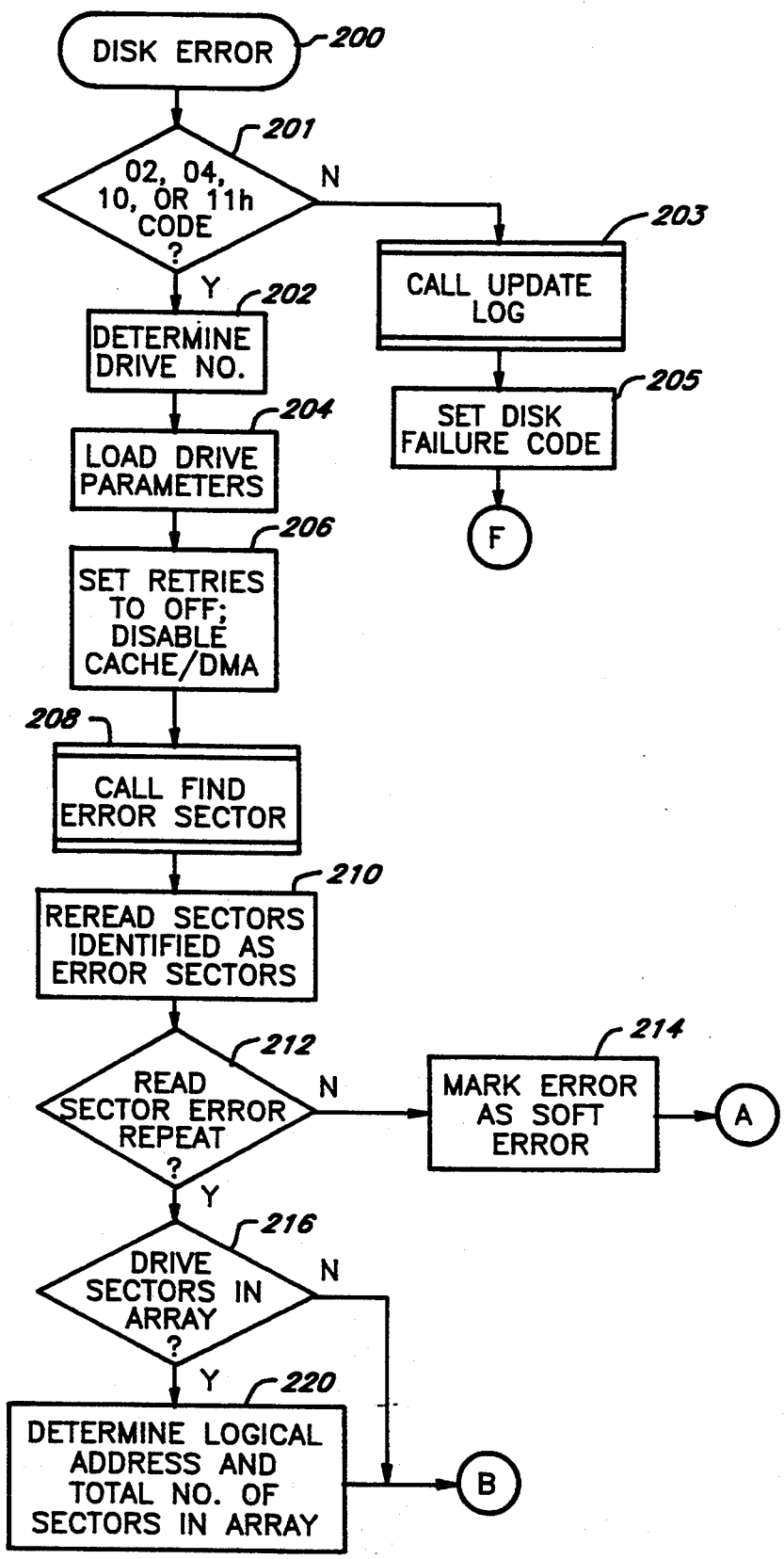
FIGS. 3A–3E are flow diagrams of the disk 2; error analysis function of the flow diagram of FIG.
Figure 3B:
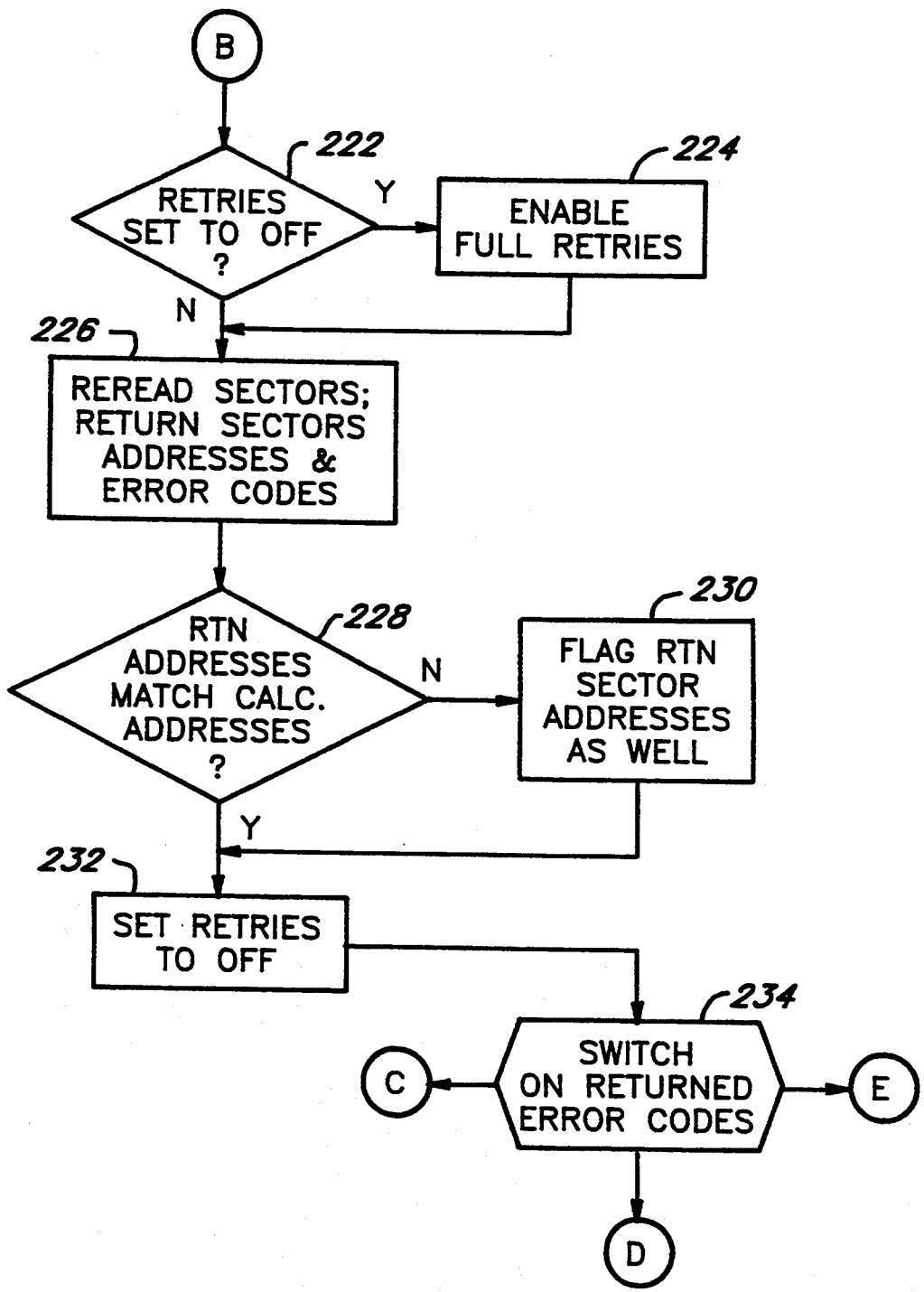
Figure 3C:
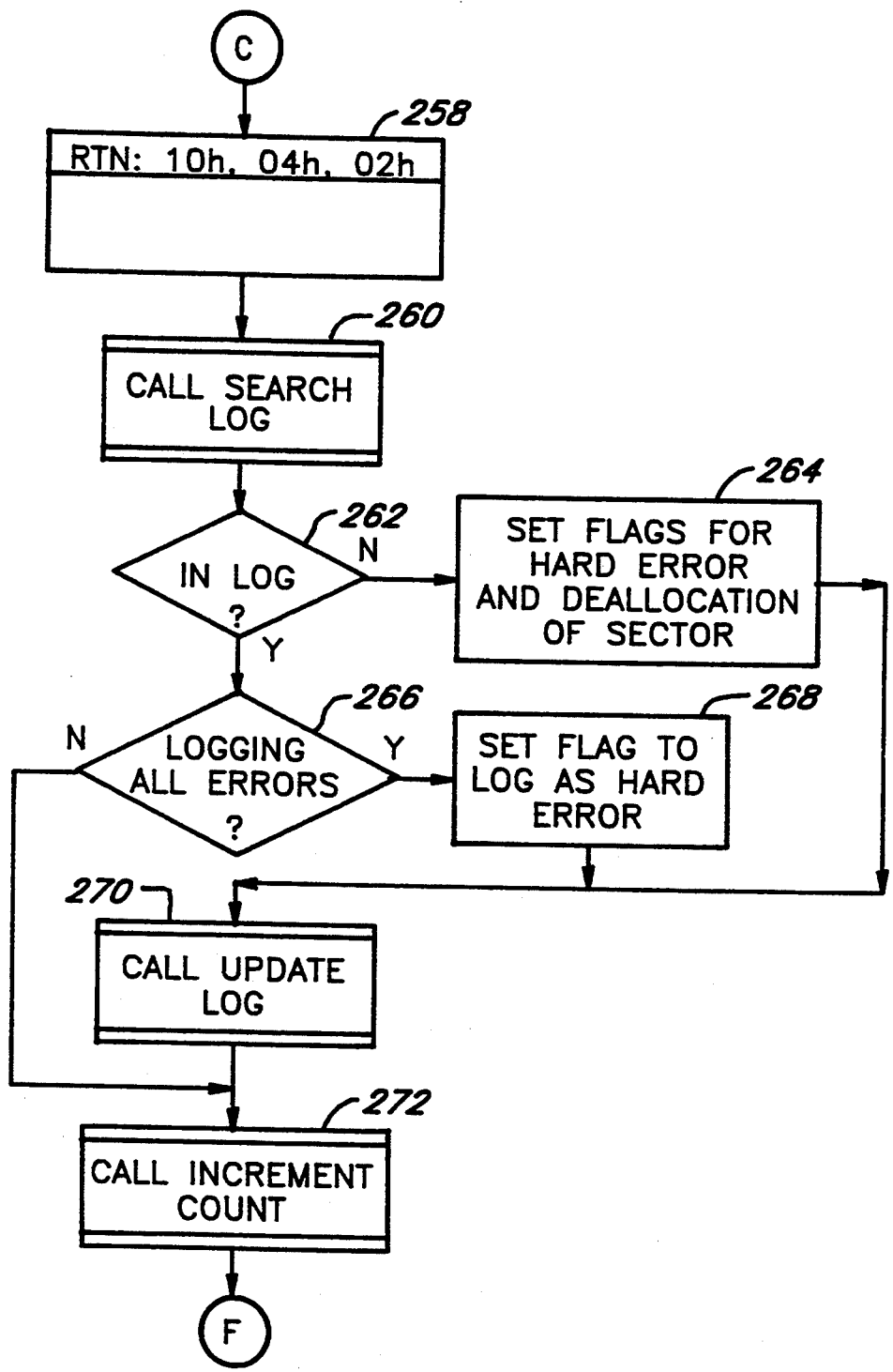
Figure 3D:
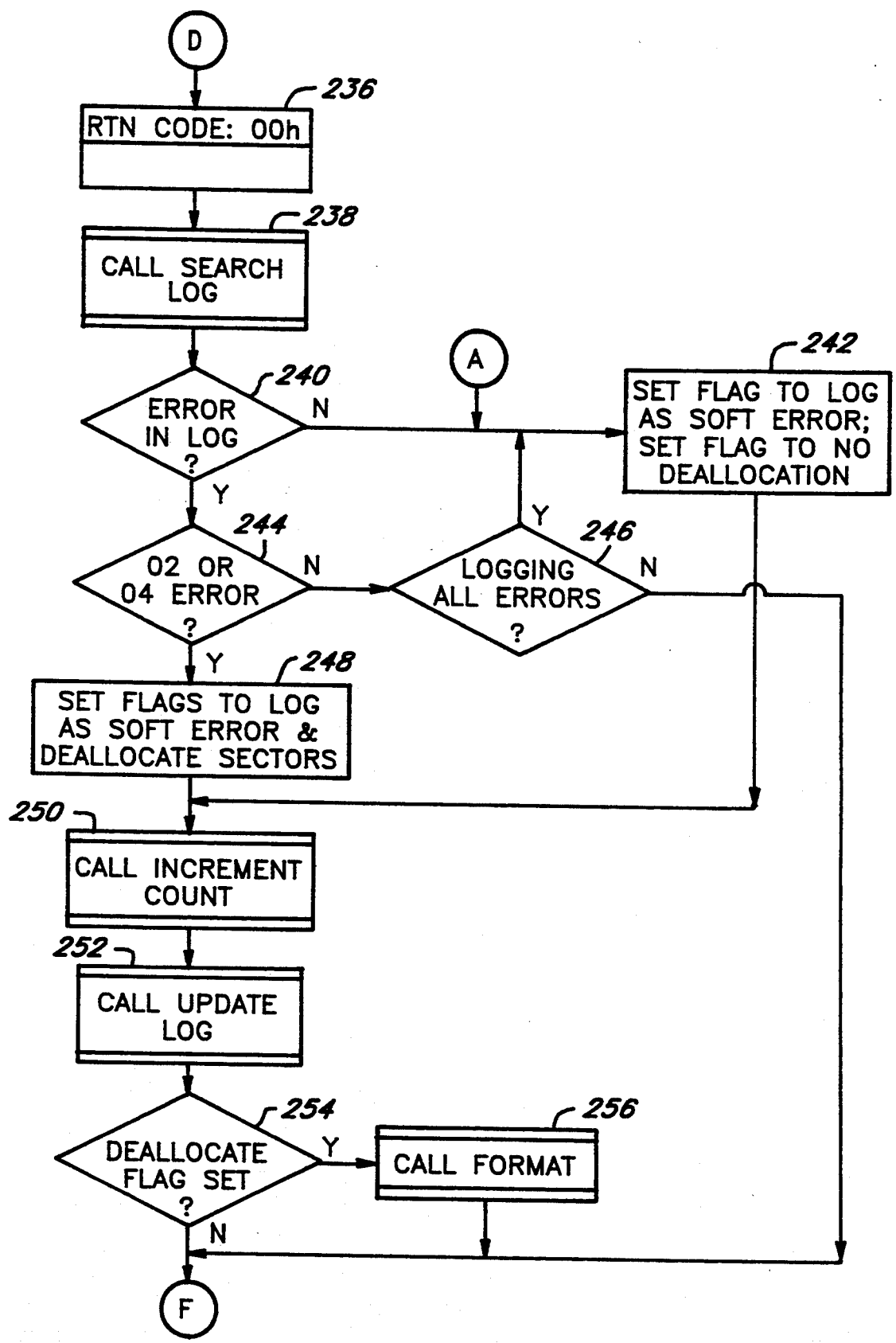
Figure 3E:
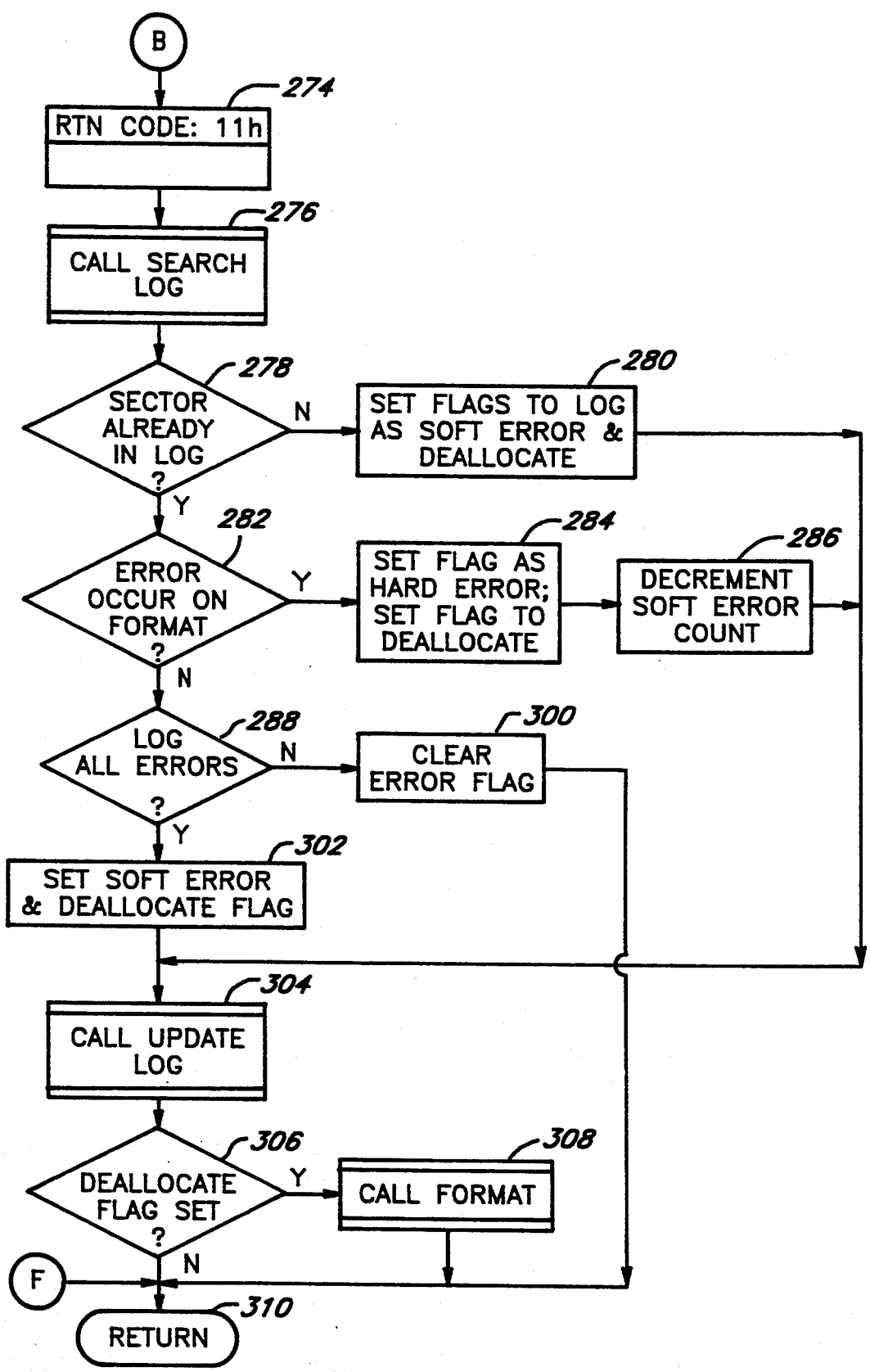

FIGS. 3A-3E are flow diagrams of the subroutine DISK ERROR 200 utilized within the system according to the present invention. Subroutine DISK ERROR 200 is called by the main program in step 112 and begins operation in step 201, where the computer 10 determines whether the return code passed to DISK ERROR was a return code other than 02h, 04h, 10h or 11h. If the return code was one other than these specified codes, control transfers to step 203, which calls subroutine UPDATE LOG. Subroutine UPDATE LOG is discussed in FIG. 7 below. Upon return from subroutine UPDATE LOG, control transfers to step 205, where the computer 10 sets a disk failure code. Control thereafter transfers to step 310 (FIG. 3E).

If in step 201, the computer determines that the return code was either a 02h, 04h, 10h or 11h, control transfers to step 202, where the computer 10 determines which disk drive is faulty. The disk drive may be identified by reading information contained within reserved information sectors on the disk under test or from failure tables maintained during program execution. A more detailed discussion of the use of reserved information sectors on a disk array may be found in U.S. patent application Ser. No. 431,741 filed Nov. 3, 1989 and assigned to Compaq Computer Corporation, assignee of the present application. This application has also been published as European Patent Publication No. 0426185, dated Mar. 22, 1991. Control transfers to step 204, where the computer 10 determines the drive specific parameters, such the number of heads, cylinders, tracks, the type of disk interface, the existence of on-the-fly ECC, the presence of an onboard disk drive cache memory and other disk specific information such as DMA configuration byte. These parameters are determined by the disk drive test program when the disk drive is originally identified (FIG. 2, step 1040 and are maintained in memory of computer 10. Control transfers to step 206, where the computer 10 disables controller retries for the track by setting a flag to OFF. Further, the computer 10 issues instructions to disable any on board disk drive memory cache which may exist on the hard disk drive 14 and to disable the disk drive DMA channel. Control of computer 10 transfers to step 208, where the computer 10 calls a subroutine FIND SECTOR. As noted above, when an error code is returned, the computer 10 only knows that a sector on a given track has failed. Subroutine FIND SECTOR is used to determine the particular sector or sectors on the track which returned the error code. Upon return from subroutine FIND SECTOR, control transfers to step 210, where the computer 10 attempts to reread the specific sectors identified by subroutine FIND SECTOR. Control transfers to step 212, where the computer 10 determines whether the attempted read to the sector(s) identified by FIND SECTOR again results in an error as indicated by the BIOS return codes 02h, 04h, 10h or 11h. If the computer 10 does not detect a 02h, 04h, 10h or 11h return code, control of computer 10 transfers to step 214, where the faulty sector is characterized as having soft error. Control of computer 10 thereafter transfers to step 242 (FIG. 3D).

If in step 212, the computer 10 receives a 02h, 04h, 10h or 11h return code following its attempt to reread the identified faulty sector or sectors, control transfers to step 216. In step 216, the computer 10 determines whether the faulty sector or sectors are part of a disk drive array. The computer 10 determines whether the disk drive is part of a disk drive array by reading reserved information sector on the hard disk drive 14. Where the disk drive is part of a disk array, the reserved information sectors will include information regarding the disk's position within the array, the number of logical drives and logical sectors within the array. If the disk drive having the faulty sectors is part of a disk drive array, control transfers to step 220, where the computer 10 determines the logical address for the faulty sectors and the number of sectors read from for that particular disk within the array. Control thereafter transfers to step 222 (FIG. 3B)

In step 222, the computer 10 determines whether disk read retries were set to off. A retry is an attempt by the disk controller to reread the faulty disk sector. The enabling of disk retries is a function of the overall test program. The computer 10 determines whether retries are set to off by reading a control bit. If set to off, control transfers to step 224, where the computer 10 enables full retries, up to a maximum of 10 disk read retries, for the faulty sectors. Control thereafter transfers to step 226. If in step 222, the computer 10 determines that the retries were enabled, control transfers to step 226. In step 226, the computer 10 rereads the faulty sector up to the maximum number of permitted retries and receives the return codes and addresses. Control thereafter transfers to step 228, where the computer 10 compares the return addresses of the faulty sectors with the calculated address determined in subroutine FIND SECTOR. If the return addresses differ from the calculated addresses, control of computer 10 transfers to step 230, where the computer 10 sets a flag to indicate that the returned error sector addresses, as well as the calculated sector addresses, are faulty sectors. Control thereafter transfers to step 232. If in step 228, the computer 10 determines that the return faulty address sectors match the calculated error address sectors, control transfers to step 232, where the computer 10 sets the retries back to off. Control thereafter transfers to step 234, which is a software switch or branch based on the returned code from the read retries performed in step 226.

If the return code is a 02h, 04h or 10h, the sector error is a hard error type and control transfers to step 258 (FIG. 3C), where the computer 10 sets a flag to look for the sector in the error log. Control thereafter transfers to step 260, where the computer 10 calls subroutine SEARCH LOG. Subroutine SEARCH LOG is used to determine whether the faulty sector is already recorded in the error log and the basis for its already being recorded in the error log. Upon return from subroutine SEARCH LOG, control transfers to step 262, where the computer 10 determines whether the faulty sectors are already in the error log. If the faulty sector is not already in the error log, control transfers to step 264, where the computer 10 sets a flag to log the sector as a hard error in the error log. Further, the computer 10 also sets a flag to deallocate the sector during a FORMAT subroutine to be discussed below. Control thereafter transfers to step 270.

If in step 262, the computer 10 determines that the faulty sectors are already in the error log, control of computer 10 transfers to step 266. In step 266, the computer 10 determines whether a flag has been set to log all errors detected during the disk drive test including logging sectors having more than one error. If all errors are being logged, control transfers to step 268 which sets a flag to log the error as a hard error. Control of computer 10 thereafter transfers to step 270. In step 270, the computer 10 calls a subroutine UPDATE LOG. Subroutine UPDATE LOG writes the faulty sector address, the type of error and the failing data pattern to the error log file maintained on the floppy disk. Upon return from subroutine UPDATE LOG, control transfers 272. If in step 266, the computer 10 that a flag has been set instructing the system incorporating the present invention not to log all errors, in particular not to log multiple errors occurring on the same sector, control of computer 10 transfers to step 272. In step 272, the computer 10 calls an INCREMENT COUNT subroutine. The INCREMENT COUNT subroutine is used to track the actual number of errors which have occurred during the disk drive test procedure. It will be appreciated that if the system incorporating the present invention has been set so as not to log multiple errors occurring on a sector, the actual error count must be maintained despite the fact that not all errors are being logged. Upon return from subroutine INCREMENT COUNT, control of computer 10 transfers to step 310 (FIG. 3E).

If in step 234, the return code is a 00h, indicating no error, control of computer 10 transfers to step 236. (FIG. 3D). If the return code is a 00h, it will be appreciated that the error which originally occurred during the first write/read sequence has not repeated. Control of computer 10 thereafter transfers to step 238, where the computer 10 calls subroutine SEARCH LOG to determine whether the sector which had been noted as a faulty sector but had subsequently returns a 00h code is already in the error log. Upon return from subroutine SEARCH LOG, control of computer 10 transfers to step 240. In step 240, the computer 10 determines whether the faulty sector is already in the error log. If the supposed faulty sector is not already in the error log, control transfers to step 242, where the computer 10 sets a flag to log the sector as having a soft error. The computer 10 also sets a flag to indicate that the faulty sector is not to be deallocated. Control thereafter transfers to step 250.

If in step 240, the computer 10 determines that the faulty sector is already in the error log, control of computer 10 transfers to step 244. In step 244, the computer 10 determines whether the faulty sector was previously logged as having a 02h or 04h error code. The presence of a 02h or a 04h error code for the existing log entry for the sector indicates that there may be an error in the disk drive header field. It will be appreciated that header field anomalies are generally considered to be more serious than data field anomalies. Accordingly, if the prior error is a 02h or a 04h error, control transfers to step 248, where the computer 10 sets a flag to log the error as a soft error. However, because of the seriousness of a possible header error, the computer 10 also sets a flag to deallocate the sector. If in step 244, the computer 10 determined that the faulty sectors originally did not return a 02h or a 04h error code, control transfers to step 246. In step 246, the computer determines whether the system has been set to log all errors. If all errors are being logged, control transfers to step 242. If all errors are not being logged, control transfers to step 310 (FIG. 3E).

Following step 248, control transfers to step 250, where the computer 10 calls a subroutine INCREMENT COUNT which keeps a current count of the number of errors detected for each type of error detected. Upon return from subroutine INCREMENT COUNT, control of computer 10 transfers to step 252, where the computer 10 calls subroutine UPDATE LOG. Upon return from subroutine UPDATE LOG, control of computer 10 transfers to step 254, where the computer 10 determines whether the deallocation flag has been set. If the deallocation flag has been set, control transfers to step 256 where the computer 10 calls subroutine FORMAT. Control thereafter transfers to step 310 (FIG. 3E). If in step 254, the computer 10 determines that no deallocation flag has been set, control of computer 10 transfers to step 310 (FIG. 3E).

If in step 234 the return code is 11h, control of computer 10 transfers to step 274. (FIG. 3E). A return code of 11h indicates that a correctable error or firm error has occurred. A firm error is one which repeats but is correctable on a drive level basis. Control of computer 10 transfers to step 276, where the computer 10 calls subroutine SEARCH LOG to determine if the faulty sector already appears in the error log. Upon return from subroutine SEARCH LOG, control of computer 10 transfers to step 278, where the computer 10 determines whether the faulty sector is already in the log. If the faulty sector is not already in the log, control transfers to step 280, where the computer 10 sets a flag to log the sector as having a soft error. Further, the computer 10 sets a flag to deallocate the faulty sector. Control thereafter transfers to step 304.

If in step 278, the computer determines that the faulty sector is already in the error log, control transfers to step 282. In step 282, the computer 10 determines whether the error has occurred during a format operation. If the error has occurred during a format, control transfers to step 284. In step 284, the computer 10 sets a flag to log the faulty sector as a hard error. The computer 10 also sets a flag to deallocate the faulty sector. Control thereafter transfers to step 286. In step 286, the computer 10 decrements the soft error count for the error previously attributed to the faulty sector. Control of computer 10 thereafter transfers to step 304. If in step 282, the computer 10 determines that the error has not occurred during a format operation, control transfers to step 288. In step 288, the computer 10 determines whether the computer 10 has been set to log all errors. If the computer 10 has been set not to log all errors, control transfers to step 300. In step 300, the computer 10 clears the error flag for the faulty sector. Control of computer 10 thereafter transfers to step 310. If in step 288 the computer 10 determines that the system has been set to log all errors, control transfers to step 302. In step 302, the computer 10 sets a flag to log the sector as having a soft error. The computer 10 also sets a flag to deallocate the sector. Control of computer 10 thereafter transfers to step 304. In step 304, the computer 10 calls subroutine UPDATE LOG. Upon return from subroutine UPDATE LOG, control of computer 10 transfers to step 306, where the computer 10 determines whether a flag has been set to deallocate the sector. If in step 306 the computer 10 determines that no deallocation flag has been set, control transfers to step 310. If the deallocation flag has been set, control of computer 10 transfers to step 308, which calls subroutine FORMAT, which deallocates the faulty sector. Upon return from subroutine FORMAT, control of computer 10 thereafter transfers to step 310. Step 310 returns control of the computer 10 to step 114 (FIG. 2), where the computer 10 determines whether the acceptable error rate for either soft or hard errors has been exceeded based on the number of bytes read.

Figure 4:
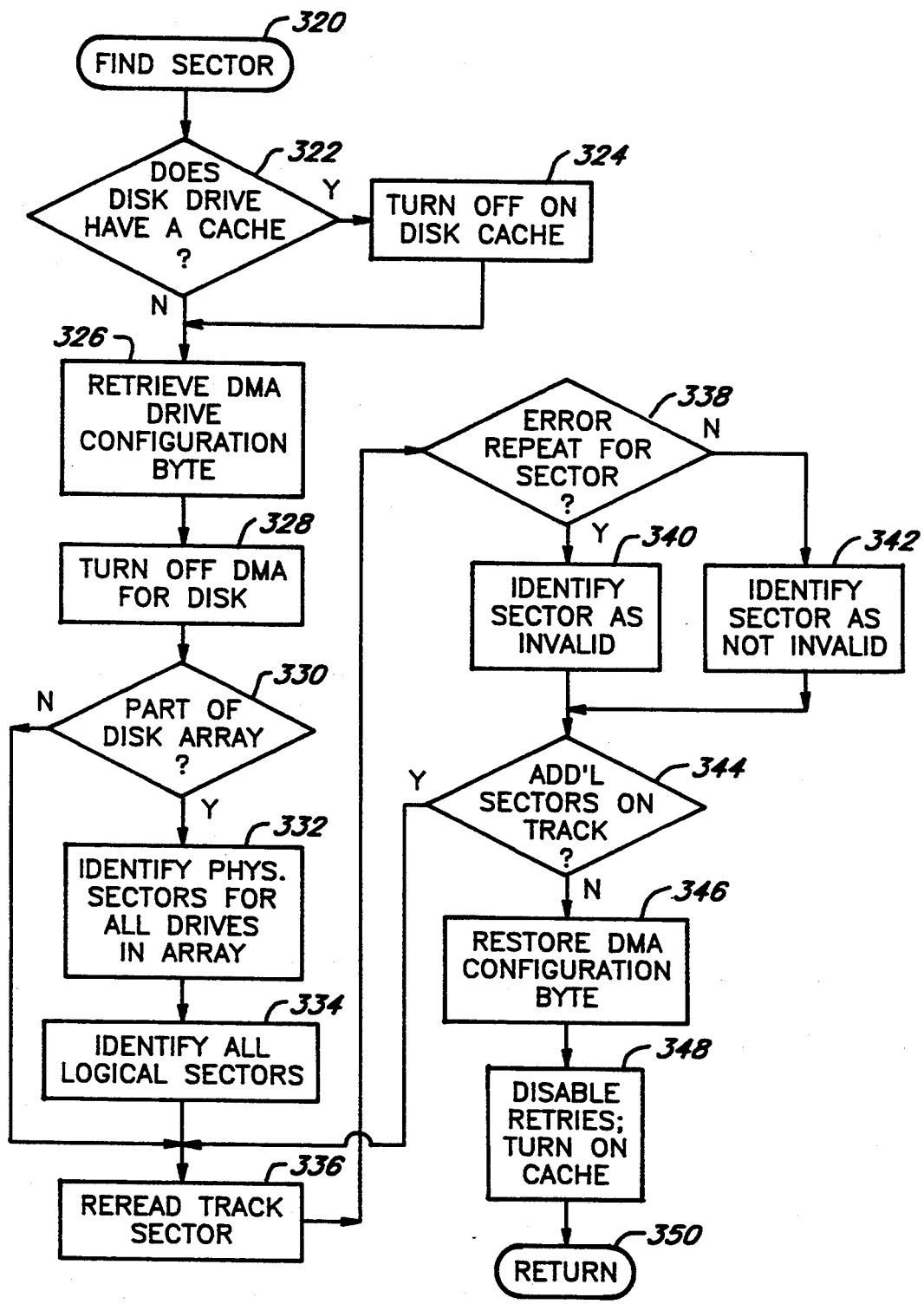
FIG. 4 is a flow diagram of a subroutine used to identify error sectors which is called by the disk error analysis program described in the flow diagram of FIG. 3.

FIG. 4 is a flow diagram of the subroutine FIND SECTOR. Operation of subroutine FIND SECTOR begins at step 320. Control of computer 10 transfers to step 322, where the computer 10 determines whether the disk drive under test has a onboard memory cache. If the disk drive under test has an onboard memory cache, control of computer 10 thereafter transfers to step 324, where the computer 10 issues a command to the disk controller to turn off the disk drive onboard cache. Control of computer 10 thereafter transfers to step 326. If in step 322, the computer 10 determines that the disk drive under test does not have a cache, control of computer 10 thereafter transfers to step 326. In step 326, the computer 10 retrieves the DMA disk drive configuration byte from the disk drive reserved information sectors. Control of computer 10 transfers to step 328, where the computer 10 disables direct memory access for the disk drive. Control of computer 10 thereafter transfers to step 330. In step 330, the computer 10 determines whether the disk drive is part of a disk array. If the disk drive having the faulty sector is part of a disk array, control thereafter transfers to step 322. In step 322, the computer 10 identifies all physical sectors for all disk drives in the array which have generated a faulty code. Control of computer 10 thereafter transfers to step 324, where the computer 10 identifies all logical sectors which have resulted in a faulty code within the array. Control of computer 10 thereafter transfers to step 336.

If in step 330, computer 10 determines that the disk drive having the faulty track is not part of a disk array, control transfers to step 336. In step 336, the computer 10 rereads a sector in the identified faulty track for a maximum of up to 10 times. Control of computer 10 thereafter transfers to step 338. In step 338, the computer 10 determines whether the sector being reread is a faulty sector if it receives a return code of 02h, 04h, 10h or 11h. As noted above, a return code of 02h, 04h, 10h or 11h indicates an error. If the error does not repeat, control transfers to step 342, where the computer 10 identifies the sector within the faulty track as a valid sector. If in step 338, the computer 10 determines that the error repeats, control transfers to step 340, where the computer 10 identifies the faulty sector within the track as invalid and returns the faulty sector address. Control transfers to step 344. In step 344, the computer 10 determines whether there are additional sectors in the faulty track to be reread. If there are additional sectors within the faulty track to be reread, control thereafter transfers to step 336. If there are no additional sectors on the track to be reread, control of computer 10 transfers to step 346, where the computer 10 restores the DMA configuration byte. Control thereafter transfers to step 348. In step 348, the computer 10 disables any further retries for the disk drive under test and restores the disk drive cache to operation. Control thereafter transfers to step 350, which returns to the calling program.

Figure 5:
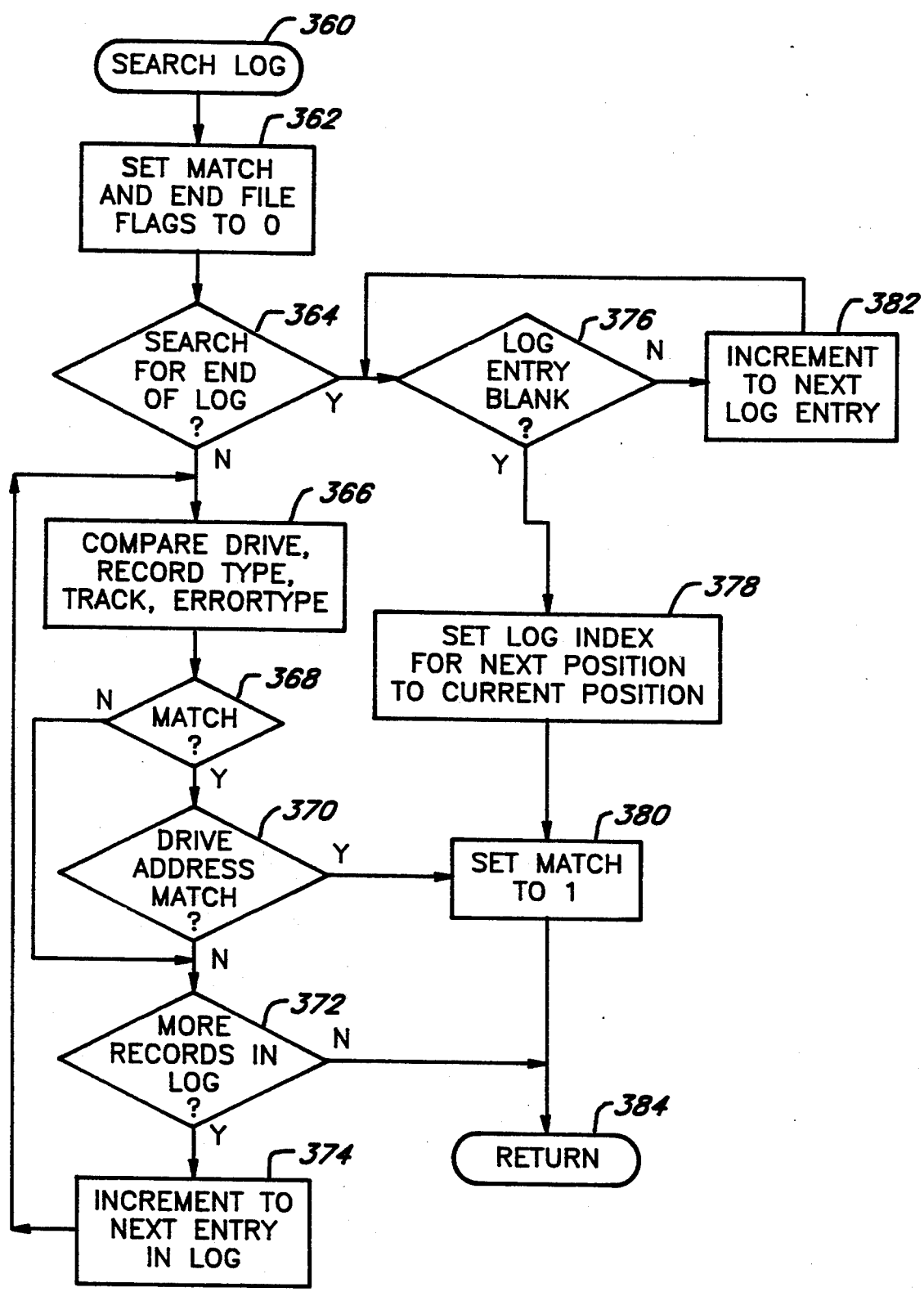
FIG. 5 is a flow diagram of a subroutine used to review the error log which is called by the disk error analysis program described in the flow diagrams of FIGS. 2 and 3.

FIG. 5 is a flow chart of the operation of subroutine SEARCH LOG 360. Operation of subroutine SEARCH LOG begins in step 362, where the computer 10 sets a match flag and an end file both to zero. Control of computer 10 thereafter transfers to step 364, where subroutine SEARCH LOG determines whether a flag has been set to find the end of the error log. It will be appreciated that in order to append new error records to the error log or to initially load a vendor flaw map, the computer 10 must locate the end of the log. If the computer 10 is not searching for the end of the log, control transfers to step 366. In step 366, the computer 10 compares the error log entry information, including drive, record type, track and error type with the current error information. Control of computer 10 transfers to step 368. If in step 368, the computer 10 determines that the drive, record type, track and error type match the current error information, control of computer 10 transfers to step 370. In step 370, the computer 10 determines whether the disk drive sector address in the log matches the current disk drive sector error address. If the drive sector address matches the current faulty address, control transfers to step 380 where the match flag is set to 1. Control thereafter transfers to step 384. If the drive sector address does not match the current faulty address, control transfers to step 372.

If in step 368, the computer 10 determines that the disk drive, record type, track and error type do not match the current error information, control thereafter transfers to step 372. If in step 370 the computer 10 determines that the current error sector address does not match the log entry address, control of computer 10 transfers to step 380. In step 372, the computer 10 determines whether there are additional records in the error log. If there are additional records in the error log, control transfers to step 374, where the computer 10 increments to the next entry in the log. Control of computer 10 transfers to step 366. If in step 372 the computer 10 determines that there are no more error records in the log, control transfers to step 384.

If in step 364, a flag to search for the end of the log has been set, control of computer 10 transfers to step 376. In step 376, the computer 10 determines whether the current entry in the log is blank. If the current entry in the log is blank, control of computer 10 transfers to step 378, which sets the log index for the position to the current position in the log. Control thereafter transfers to step 380. In step 380, the computer 10 sets the match index to 1. Control transfers to step 384 which returns control of the computer 10 to the calling program. If in step 376, the computer 10 determines that the current log entry is not blank, control thereafter transfers to step 382. In step 382, the computer 10 increments to the next log entry and control thereafter transfers to step 376.

Figures 6, 7:
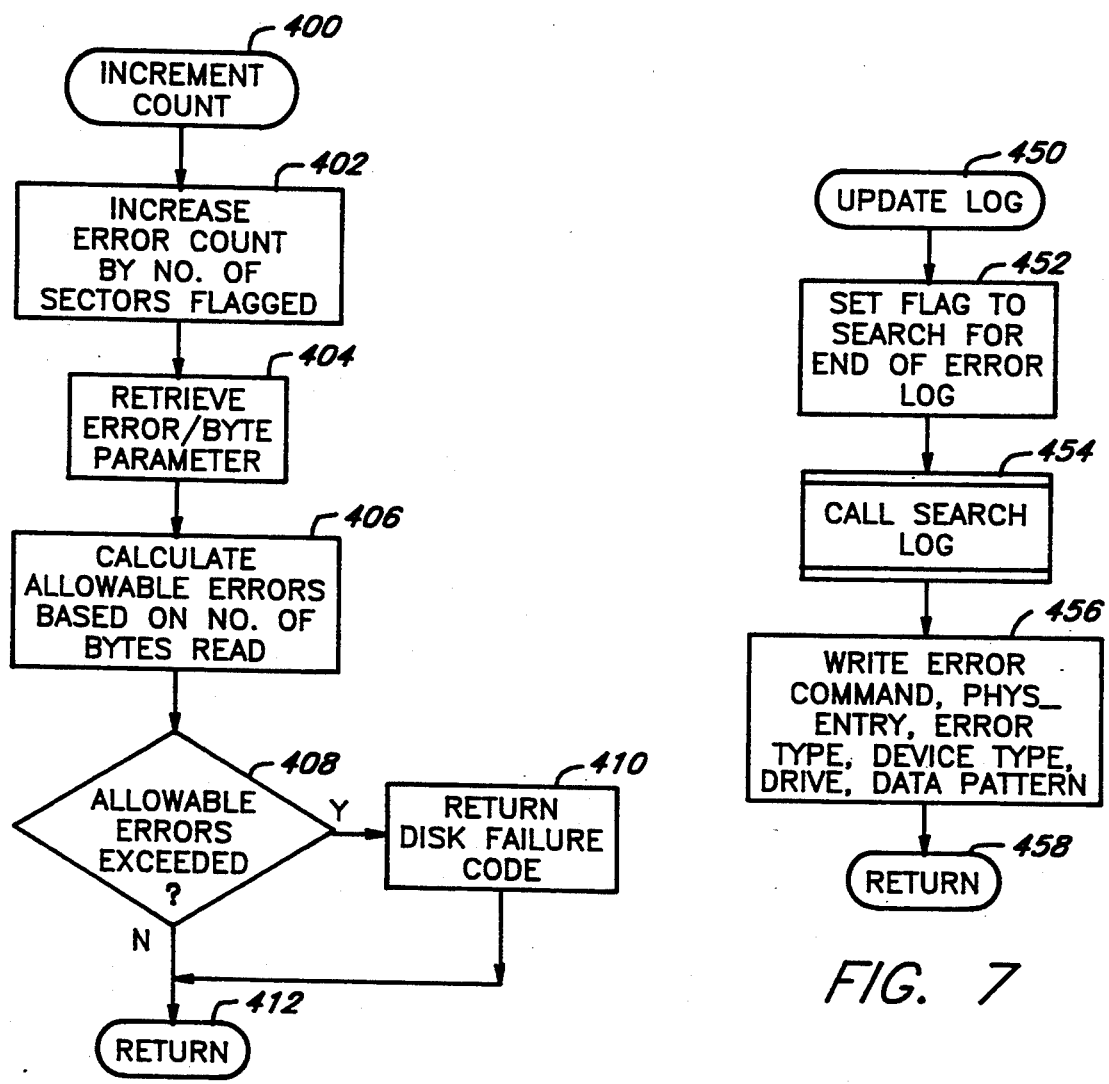
FIG. 6 is a flow diagram of a subroutine used to increment the error count which is called by the disk error analysis program described in the flow diagram of FIG. 3.
FIG. 7 is a flow diagram of a subroutine used to update the error log which is called by the disk error analysis program described in the flow diagram of FIG. 3.

FIG. 6 is a flow diagram of the subroutine INCREMENT COUNT 400 which begins operation at step 402, where the computer 10 increments the appropriate error count based on the type of error flag for the number of sectors flagged. It will be appreciated that step in 402 the computer 10 will increment the hard error count or the soft error count according to flags set in prior subroutines. Control thereafter transfers to step 404. In step 404, the computer 10 retrieves the acceptable error rates per byte parameter. Control thereafter transfers to step 406, where the computer 10 calculates the maximum allowable hard, soft or total errors based on the total number of bytes read. Control thereafter transfers to step 408. In step 408, the computer 10 determines whether the allowable error rate for all of the error types and cumulative errors, based on the number of bytes read, has been exceeded. If any one of the allowable error rates for the number of bytes read has been exceeded, control thereafter transfers to step 410, where the computer 10 sets a disk failure code. Control thereafter to step 412, which returns to the calling program. If in step 408 it is determined that the allowable errors per bytes read has not been exceeded, control thereafter transfers to step 412.

FIG. 7 is a flow diagram of the subroutine UPDATE LOG 450. Operation of the UPDATE LOG subroutine 450 begins at step 452, where the computer 10 sets a flag to search for the end of the error log. Control transfers to step 454, where the computer 10 calls subroutine SEARCH LOG to find the end of the error log. Upon return from subroutine SEARCH LOG, control of computer 10 transfers to step 456, where the computer 10 appends the current error information, including the command and data pattern on which the error occurred, the physical address, the error type and the disk type. Upon completion of writing to the error log, control of computer 10 transfers to step 458, which returns control of the computer 10 to the calling program.

Figure 8:
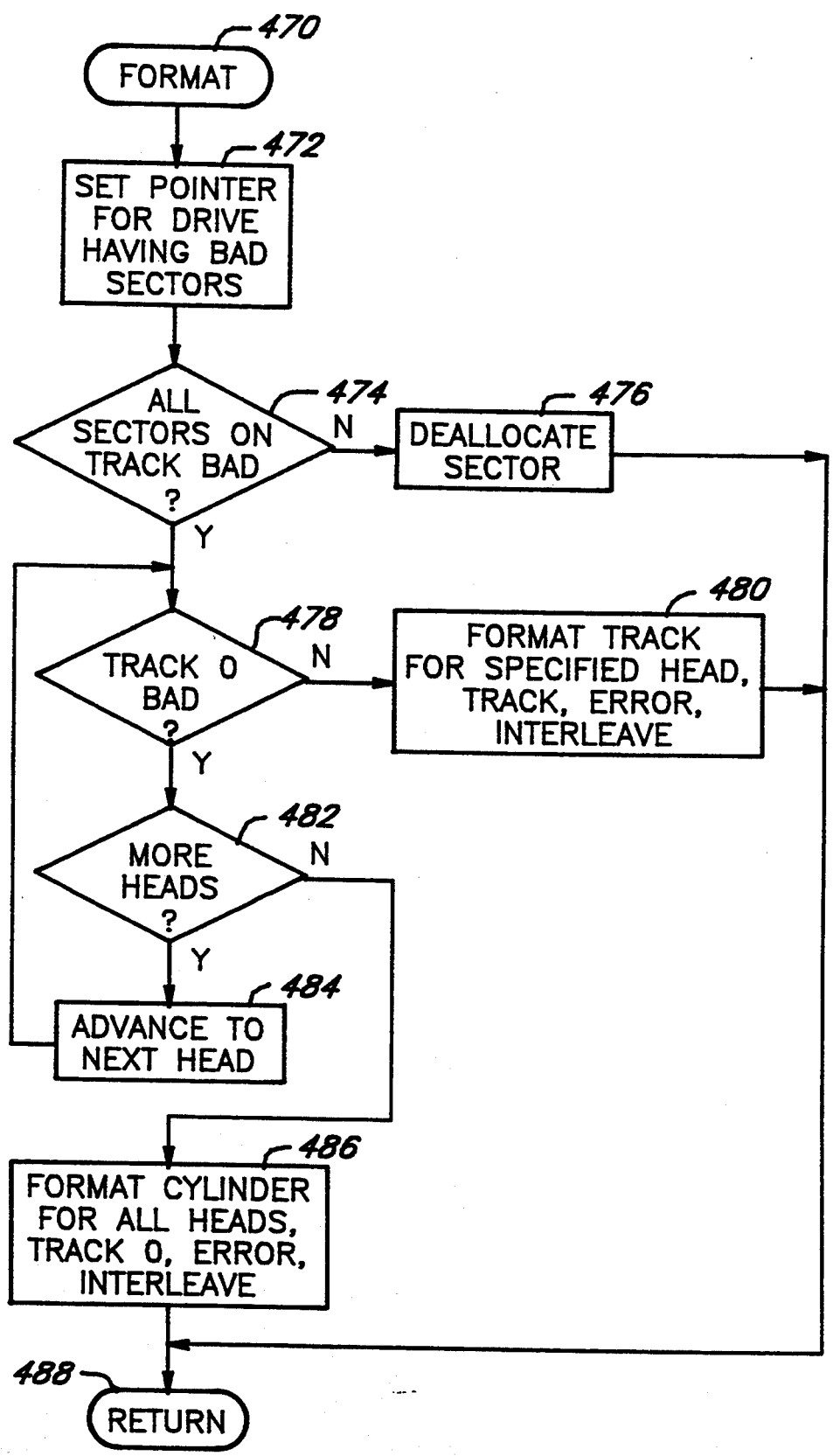
FIG. 8 is a flow diagram of a subroutine used to deallocate faulty disk sectors which is called by the disk error analysis program described in the flow diagram of FIG. 3.

FIG. 8 is a flow diagram of the FORMAT subroutine. The subroutine FORMAT is utilized to both deallocate sectors and reformat entire tracks and, in specific instances, entire cylinders. Operation of subroutine FORMAT begins at step 470. Control of computer 10 transfers to step 472, where the computer 10 sets an identification pointer for the specific disk drive having the current error. Control transfers to step 474, where the computer 10 reviews the error information and determines whether the error data includes an entire track of sectors. If in step 474, the computer 10 determines that the error information does not account for an entire disk drive track, control of computer 10 transfers to step 476, where the computer 10 deallocates the bad sectors, marking them as unusable. Control of computer 10 transfers to step 488, which returns control of the computer 10 to the calling program.

If in step 474, the computer 10 determines that all of the sectors on a single track have been noted as having an error, control of computer 10 transfers to step 478, where the computer 10 determines whether the bad track is track 0. Track 0 is generally reserved and utilized to store disk specific information. If in step 478, the computer 10 determines that the bad track is not track 0, control transfers to step 480, where the computer 10 formats the identified head and track utilizing the interleave scheme retrieved in step 204 (FIG. 3A). Control of computer 10 transfers to step 488.

If in step 478, the computer 10 determines that the faulty track is track 0, control of the computer 10 transfers to step 482, where the computer 10 determines if there are additional heads within the hard disk drive cylinder for the faulty track. If there are additional heads, control transfers to step 484, where the computer 10 advances the head pointer to the next head in the cylinder. Control thereafter transfers to step 478. If in step 482 the computer 10 determines that there are no more heads in the cylinder, control transfers to step 486, where the computer 10 formats the cylinder for track 0 for all of the heads, utilizing the interleave scheme determined in step 204 (Fig. 3A). Control of computer 10 transfers to step 488, which returns control of the computer 10 to the calling program.

Thus, a system according to the present invention is capable of capturing and characterizing error information during disk tests. Further, the system according to the present invention is capable of dynamically determining whether the disk under test has exceeded acceptable error rates based on the actual number of bytes read. This permits an early determination of a failing disk and saves considerable manufacturing and testing time.

Further, a system according to the present invention saves error log information, including specific sector addresses, error rates, error types and data patterns. This information may be used for subsequent analysis of failing and passing disk drives. This subsequent analysis may be used to develop improvements to a disk drive design. Thus, it will be appreciated that a system according to the present invention may be utilized by both the computer manufacturer and the disk drive manufacturer.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

We claim:

1. A computerized method for dynamically measuring hard disk error rate performance during a computer disk test procedure, the method comprising the steps of:
    (a) the computer reading stored disk parameters of a disk drive under test, said parameters including disk identification information and predetermined acceptable error rates;
    (b) the computer writing a data pattern to a track on said disk drive under test, said disk drive having a plurality of tracks, each of said tracks comprised of a plurality of disk sectors,
    (c) the computer totaling the number of bytes being read from said disk drive under test with each read operation;
    (d) the computer reading said disk track and receiving a success code or one of a plurality of error codes upon reading said disk track, each of said error codes indicating an error type, where the receipt of one of said plurality of error codes causes said disk track to be characterized as a faulty track;
    (e) the computer, upon receipt of an error code upon reading said disk track,
        (1) determining which of said sectors within said track caused said error code to be generated, said sector causing said error code to be generated being characterized as a faulty sector;
        (2) determining said error type for said faulty sector based on said error code, and determining an address and associated error information for said faulty sector;
        (3) storing said faulty sector address, said error type and said associated error information in an error log;
        (4) totaling the number of disk errors of each of said error types;
        (5) determining whether the number of disk errors for any of said error types exceeds said predetermined acceptable error rates based on said total number of bytes read from said disk drive;
        (6) indicating a failure condition when said disk errors have exceeded predetermined acceptable error rates;
        (7) halting the disk test procedure when said predetermined acceptable error rates have been exceeded; and
    (f) the computer repeating steps (b)–(e) until completion of the disk test procedure or until the computer halts the disk test procedure.

2. The method of claim 1, where said step of determining said faulty sector address includes the steps of:
    the computer disabling any onboard cache and direct memory access for said disk drive under test;
    the computer rereading all sectors within said faulty track after disabling said onboard cache and direct memory access;
    the computer receiving a return code indicating a successful or failed read for each sector within said disk track;
    the computer identifying said sectors causing said return codes to indicate a failed read return code as faulty sectors and returning said faulty sector addresses; and
    the computer enabling said onboard cache and direct memory access.

3. The method of claim 1, further including the steps of:
    the computer determining if all of said sectors within said faulting disk track are faulty sectors and formatting said faulting track; and
    the computer deallocating said faulty sector addresses where said faulty track does not include all faulty sectors.

4. The method of claim 1, wherein said step of storing said faulty sector address includes the steps of:
    the computer determining if said faulty sector address is already in an error log;
    the computer increasing the total number of errors for the appropriate error type;
    the computer selectively adding said faulty sector address, said error type and said error information to said error log, where said faulty sector address already appears in said error log.

5. The method of claim 4, wherein the step of selectively adding said faulty sector address, said error type and said error information further includes the steps of:
    the computer determining whether said disk drive under test includes a map of predetermined sector addresses, said predetermined sector addresses known to be faulty sectors;
    the computer loading said predetermined sector addresses into said error log;
    the computer not adding said faulty sector address, said error type and said error information for said faulty sector where said faulting sector address is one of said predetermined sector addresses.

6. The method of claim 1, wherein the steps (a)–(f) are perforated on a computer incorporating said disk drive under test.

* * * * *

UNITED STATES PATENT AND TRADEMARK OFFICE
CERTIFICATE OF CORRECTION

PATENT NO.   : 5,422,890
DATED        : JUNE 6, 1995
INVENTOR(S)  : BENNY J. KLINGSPORN ET AL.

It is certified that error appears in the above-identified patent and that said Letters Patent is hereby corrected as shown below:

In col. 16, lines 23 and 24, please replace "faulting" with --faulty--.

In col. 16, line 49, please replace "faulting" with --faulty--.

In col. 16, line 52, please replace "perforated" with --performed--.

Signed and Sealed this

Twenty-ninth Day of August, 1995

Attest:

BRUCE LEHMAN

Attesting Officer

Commissioner of Patents and Trademarks